July 5, 1966

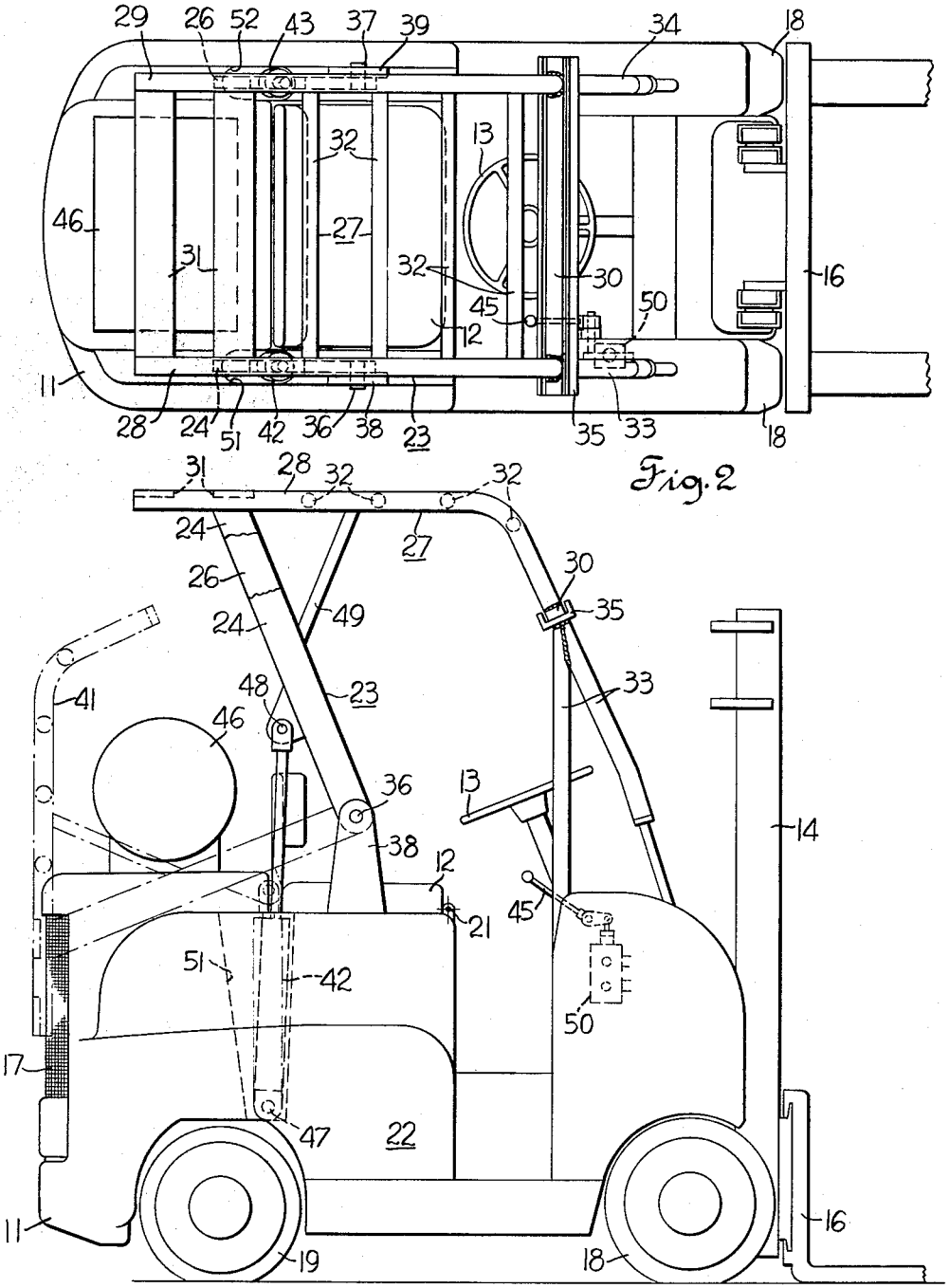

N. J. RYSKAMP 3,259,211

RETRACTABLE OVERHEAD GUARD

Filed July 20, 1964

Inventor
Neil J. Ryskamp
By Charles L. Schust
Attorney

United States Patent Office 3,259,211
Patented July 5, 1966

3,259,211
RETRACTABLE OVERHEAD GUARD
Neil J. Ryskamp, Markham, Ill., assignor to Allis-Chalmers Manufacturing Company, Milwaukee, Wis.
Filed July 20, 1964, Ser. No. 383,876
11 Claims. (Cl. 187—9)

This invention relates to an overhead guard for an industrial vehicle or the like and particularly relates to an overhead guard which can be quickly retracted to a reduced overall height to allow the truck to operate in minimum overhead clearance areas.

Lift trucks are frequently equipped with overhead guards to protect the operator in case a load accidently falls from a point above. This may happen, for example, when a lift truck is operating below a crane, as in shiploading or when a truck collides with a tall stack causing goods to be dislodged from the top thus endangering the truck operator. Such guards, when a fixed part of the truck, often prevent use of the truck in low overhead assignments such as loading highway trucks.

It is an object of this invention to provide overhead guard protection for a truck operator when needed, which may be quickly and easily lowered into a position permitting the truck to be operated in a low overhead clearance area without interferring with maneuverability of the truck.

It is a further object of this invention to provide a retractable overhead guard for an industrial vehicle which when retracted does not reduce the operator's head room or substantially increase the overall length of the vehicle.

It is a further object of this invention to provide an overhead guard for a lift truck which may be lowered and raised by the operator while he is driving the truck to and from a highway trailer or similar low clearance area.

These and other objects of this invention will be apparent to those familiar with vehicular overhead guards when the following description is read in conjunction with the drawings in which:

FIG. 1 is a side view of a lift truck having an overhead guard installation incorporating the present invention;

FIG. 2 is a top view of the truck shown in FIG. 1;

Figure 4:
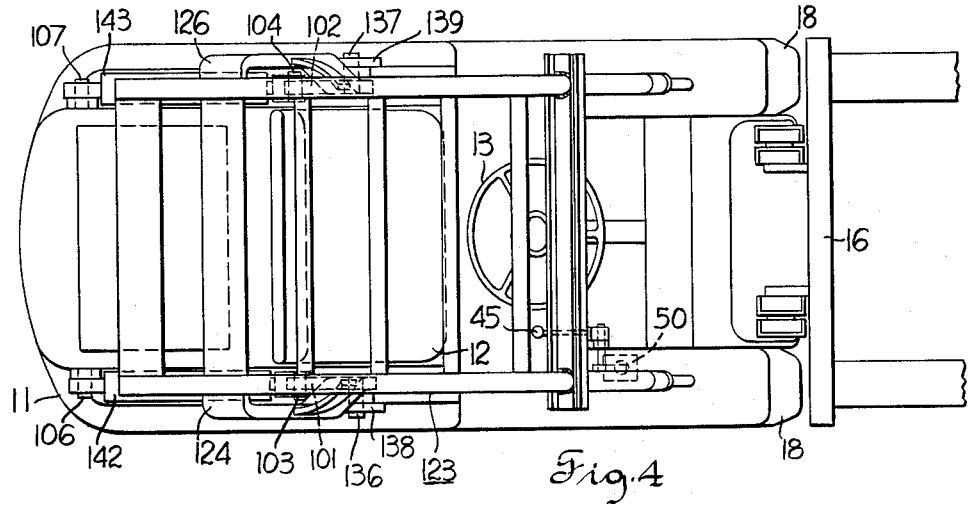
FIG. 4 is a top view of the truck shown in FIG. 3.

Referring to FIGS. 1 and 2, a lift truck 11 is depicted having an operator's station including a seat 12 and a steering wheel 13. The truck has an extensible mast 14 and carriage 16 at its front end and a radiator grill 17 at its rear end. As is conventional in lift truck construction, the front wheels 18 are powered by a rear mounted engine, not shown, and the rear wheels 19 are steerable. The seat 12 pivots forward about a transverse pivot axis 21 thereby providing servicing access to the engine and accessories.

My overhead guard 23 is supported on the chassis 22 of the truck 11 in a manner permitting it to be quickly lowered to the minimum mast height. Laterally spaced depending legs 24, 26 are rigidly secured as by welding to a top screen portion 27 which includes longitudinally extending side members 28, 29 rigidly interconnected by flat cross bars 31 and round cross bars 32.

The forward parts of the side members 28, 29 incline downwardly and forwardly terminating in an abutment segment in the form of a transverse part 30 which nests within the upwardly opening recess of a channel 35. The channel 35 is part of a support structure which includes upright supports 33, 34 rigidly secured to the chassis 22. The legs 24, 26 of the guard 23 are pivotally connected by coaxial pins 36, 37 to mounting brackets 38, 39 rigidly secured to the chassis 22.

The overhead guard 23 may be swung to a rearwardly retracted position shown in dot-dash lines 41 by contracting hydraulic jacks 42, 43. The guards 23 in its retracted position 41 and the support structure 33, 34, 35 are preferably at least as low as the minimum height of the mast 14, which is the height illustrated in FIG. 1. This permits the truck to operate in highway trucks and low door or low ceiling situations when the guard is retracted.

My overhead guard in both its retracted and raised positions allows adequate head room for the operator, permits servicing of the truck, allows good all around operator visibility and does not decrease the maneuverability of the truck. My retractable overhead guard design, as illustrated in both embodiments, permits installation of an optional LP gas tank 46 in the usual position behind the operator's station without any interference.

Operation of the power means in the form of jacks 42, 43 is through a conventional hydraulic control system which includes a manual control lever 45 at the operator's station connected to an appropriate hydraulic control valve 50. The bottom of the jack 42 is pivotally secured to the chassis 22 by a pin 47 and jack 43 is similarly connected to the chassis. The rod end of jack 42 is pivotally connected to the leg 24 by a pin 48 and a similar connection is provided between the piston rod of jack 43 and leg 26. A brace 49 is provided between each of the legs 24, 26 and its corresponding top member 28, 29. The jacks 42, 43 are disposed in wells or pockets 51, 52 in the side wall and counterweight portions of the chassis thus providing a clean, compact design.

Figure 3:
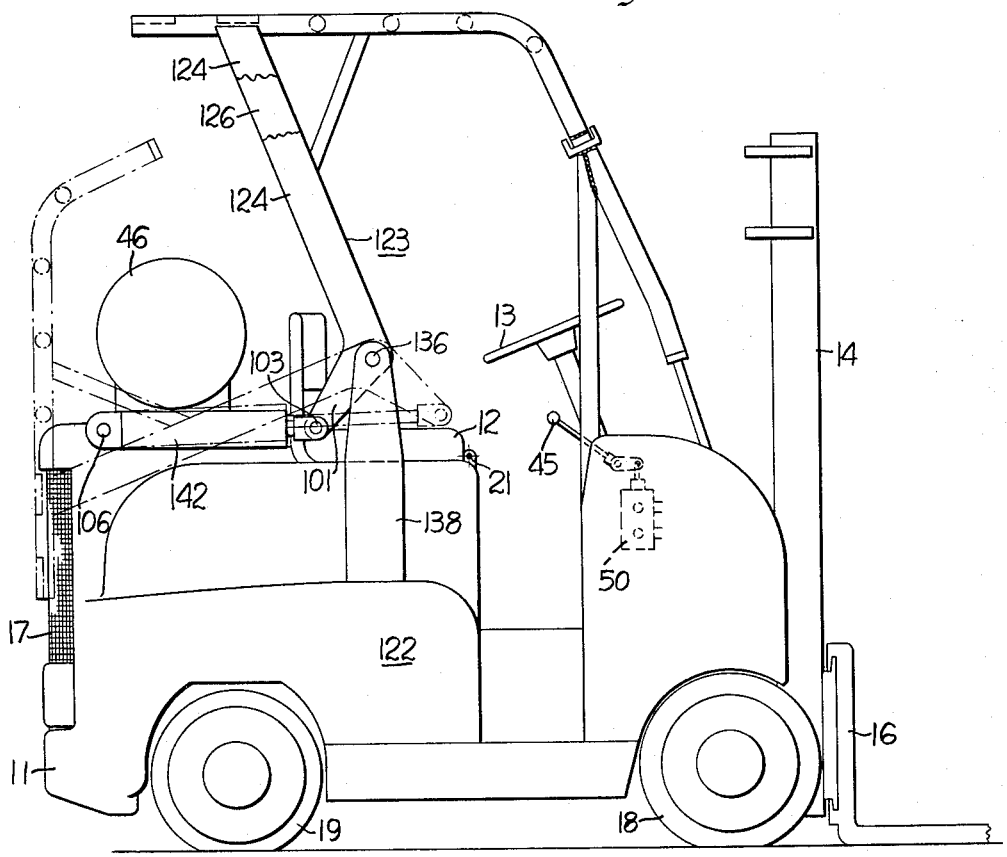
FIG. 3 is a side view of a truck in which a second embodiment of this invention is incorporated.

The construction of the overhead guard 123 shown in FIGS. 3 and 4 is similar to the embodiment of FIGS. 1 and 2 except the operating jacks 142, 143 are disposed longitudinally along the top of the truck adjacent opposite lateral sides thereof. The front ends of the jacks 142, 143 are pivotally connected to depending feet 101, 102 of legs 124, 126 by pins 103, 104. The legs 124, 126 of the retractable guard 123 are pivotally connected to the chassis 122 on a common transverse axis by pins 136, 137 secured to brackets 138, 139. The cylinder ends of jacks 142, 143 are pivoted to the chassis 122 of the truck by pins 106, 107.

The preferred embodiment is the one most compatible with location of other equipment on the truck. If the space at the lateral sides of the engine compartment is required for accessory equipment for the engine, for instance, then the embodiment of FIGS. 3 and 4 may be preferred. The nesting relationship between part 30 and channel 35 affords good vertical load support in event of articles dropping on the screen 27 and permits disengagement without releasing fastening means which might otherwise be required. Thus the operator may load or unload in a high stacking area with the guard up then retract the guard when moving toward a low doorway or toward a highway truck being loaded or unloaded by the truck. The vehicle need not be stopped to raise or lower the guard and the operator need not leave his seat. Thus the operating time cycle for loading or unloading operations is not extended by the raising and retracting of the guard.

The embodiments of the invention in which can exclusvie property or privilege is claimed are defined as follows:

1. In a lift truck having a vertical mast assembly, the combination comprising:
   a chassis,
   an operator's seat mounted on said chassis,
   an overhead guard having a horizontally extending screen disposed directly above said seat and having a forwardly and downwardly extending part at its forward end, and legs depending downwardly from said screen portion and pivotally connected on a transverse pivot axis to said chassis at opposite lateral sides thereof, support structure rigidly secured to laterally opposite sides of said chassis and extending upwardly to no greater height than said mast, said part of said screen being in vertical load transmitting relation to said support structure and power means on said vehicle connected to said guard and selectively operable to pivot said guard about said axis between an upright position in which said part on said screen engages said support structure and a rearwardly retracted position in which said screen extends upwardly closely adjacent the rear of said truck, said guard in its retracted position being of substantially no greater height than said mast.

2. The structure set forth in claim 1 wherein said part and said support structure have an abutting, vertical load transmitting relationship upon said guard being pivoted to its upright position.

3. The structure set forth in claim 2 wherein said support structure includes an upward opening recess for receiving said part of said screen.

4. The structure set forth in claim 3 wherein said power means includes a pair of hydraulic jacks interposed between said chassis and said legs, respectively.

5. The structure set forth in claim 4 wherein said chassis includes an upwardly opening pocket at laterally opposite sides of said truck and wherein the major portions of said jacks are disposed within said pockets in an upright position.

6. The structure set forth in claim 4 wherein each of said legs has a foot extending downwardly from said transverse pivot axis and said jacks are longitudinally disposed along opposite lateral sides of said truck and are pivotally connected, respectively, to said feet.

7. In a lift truck having a vertical mast assembly, the combination comprising:

a chassis, an operator's seat mounted on said chassis, an overhead guard having a screen portion above said seat, and legs depending downwardly from said screen portion and pivotally connected on a transverse pivot axis to said chassis at opposite lateral sides thereof, support structure forwardly of said legs including upright supports rigidly secured to laterally opposite sides of said chassis and extending upwardly to a height not greater than said mast, a forwardly and downwardly extending part on said screen portion in vertical load transmitting relation to said support structure and power means interconnected between said chassis and said guard and selectively operable to pivot said guard about said axis between an upright position in which said part on said screen engages said support structure and a rearward retracted position in which said screen is adjacent the rear of said truck, said guard in its retracted position being substantially of no greater height than said mast.

8. The structure set forth in claim 7 wherein said support structure includes a transverse member presenting an upward opening recess extending transversely along its top and wherein said part of said screen includes a transverse segment nested in said recess when said guard is in its upright position.

9. In a lift truck, the combination comprising:

a chassis, a vertical mast assembly, an operator's seat mounted on said chassis, an overhead guard pivotally connected on a transverse pivot axis to said chassis at opposite lateral sides of said seat for vertical swinging movement between raised and rearwardly retracted positions, support structure rearward of said mast assembly and forwardly of said seat including upright supports rigidly secured to laterally opposite sides of said chassis and extending upwardly to a height less than the height of said guard in its upright position, a forwardly and downwardly extending part on said guard in vertical load transmitting relation to said support structure in the raised position of said guard and power means interconnected between said chassis and said guard and selectively operable to pivot said guard between its raised and retracted positions, said guard in its retracted position being of less height than in its raised position.

10. The structure set forth in claim 9 wherein said part and structure present cooperating abutment segments one of which is recessed and the other of which fits within said recess in the raised position of said guard.

11. The structure set forth in claim 9 wherein the overall length of said truck is not substantially increased when said guard is in its retracted position.

References Cited by the Examiner

UNITED STATES PATENTS

| 2,349,352 | 5/1944 | Johnson | 214—672 |
| 2,962,179 | 11/1960 | Molitor et al. | 214—670 |
| 3,015,402 | 1/1962 | Morton et al. | 214—620 |
| 3,188,111 | 6/1965 | Ells et al. | 214—672 X |

GERALD M. FORLENZA, *Primary Examiner.*

R. B. JOHNSON, *Assistant Examiner.*